United States Patent
Babbar et al.

(10) Patent No.: US 11,652,666 B2
(45) Date of Patent: May 16, 2023

(54) METHODS FOR IDENTIFYING A SOURCE LOCATION IN A SERVICE CHAINING TOPOLOGY

(71) Applicant: VMware, Inc., Palo Alto, CA (US)

(72) Inventors: Mansi Babbar, Fremont, CA (US); Subin Cyriac Mathew, San Jose, CA (US); Chidambareswaran Raman, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 766 days.

(21) Appl. No.: 16/580,456

(22) Filed: Sep. 24, 2019

(65) Prior Publication Data
US 2021/0036891 A1 Feb. 4, 2021

Related U.S. Application Data

(63) Continuation-in-part of application No. 16/526,788, filed on Jul. 30, 2019, now abandoned.

(51) Int. Cl.
*H04L 12/46* (2006.01)
*H04L 61/2592* (2022.01)
(Continued)

(52) U.S. Cl.
CPC ...... *H04L 12/4679* (2013.01); *G06F 9/45545* (2013.01); *G06F 9/45558* (2013.01);
(Continued)

(58) Field of Classification Search
CPC . H04L 12/4679; H04L 12/4633; H04L 49/70; H04L 2101/622; H04L 61/2592;
(Continued)

(56) References Cited

U.S. PATENT DOCUMENTS 9,215,210 B2 * 12/2015 Raman ................ H04L 63/0272
10,764,234 B2 * 9/2020 Mittal .................. H04L 61/103
(Continued)

OTHER PUBLICATIONS

Gross, J. Ed. "Geneve: Generic Network Virtualization Encapsulation draft-ietf-nvo3-geneve-08", dated Oct. 7, 2018, 29 pages.
(Continued)

*Primary Examiner* — Habte Mered
(74) *Attorney, Agent, or Firm* — Barta, Jones & Foley, PLLC

(57) ABSTRACT

In an embodiment, a computer-implemented method provides mechanisms for identifying a source location in a service chaining topology. In an embodiment, a method comprises: receiving a query, from a service plane implementation module executing on a host of a service virtual machine ("SVM"), for a location of a source host implementing a guest virtual machine ("source GVM") that originated a packet in a computer network and that serviced the packet; in response to receiving the query, performing a search of bindings associated with one or more virtual network identifiers ("VNIs") or service virtual network
(Continued)

410 Receive, by a Data Path, a Query, from a Service Plane Implementation Module, for a Location of a Host that Implements a Source GVM

412 Search all Bindings, Received from a Controller, to Identify a Particular Binding for the Source GVM

414 Provide VTEP MAC/IP Addresses, from the Particular Binding, to the Host of the SVM identifiers ("SVNIs") to identify a particular binding that includes a MAC address of the host implementing the source GVM; identifying, in the particular binding, the location of the source host; and providing the location of the source host to the host of the SVM to facilitate forwarding of the packet from the SVM to the GVM.

20 Claims, 6 Drawing Sheets

(51) Int. Cl.
*H04L 45/741* (2022.01)
*G06F 9/455* (2018.01)
*H04L 49/00* (2022.01)
*H04L 101/622* (2022.01)

(52) U.S. Cl.
CPC ........ *H04L 12/4633* (2013.01); *H04L 45/741* (2013.01); *H04L 49/70* (2013.01); *H04L 61/2592* (2013.01); *G06F 2009/45595* (2013.01); *H04L 2101/622* (2022.05)

(58) Field of Classification Search
CPC . H04L 61/103; H04L 45/741; G06F 9/45545; G06F 9/45558; G06F 2009/45595
See application file for complete search history.

(56) References Cited

U.S. PATENT DOCUMENTS

| | | | |
|---|---|---|---|
| 2009/0287848 A1* | 11/2009 | Kamura | .............. H04L 12/4641 709/246 |
| 2017/0214613 A1* | 7/2017 | Zhang | ..................... H04L 45/74 |
| 2019/0102555 A1* | 4/2019 | Novak | ..................... G06F 21/57 |
| 2019/0132278 A1* | 5/2019 | Mittal | ................... H04L 61/103 |
| 2019/0356632 A1* | 11/2019 | Mittal | ................. H04L 63/0227 |
| 2020/0314692 A1* | 10/2020 | Mittal | ................... H04W 40/24 |
| 2020/0366645 A1* | 11/2020 | Raman | ............... G06F 9/45558 |
| 2021/0067484 A1* | 3/2021 | Parab | ..................... H04L 49/70 |
| 2021/0226892 A1* | 7/2021 | Fu | .......................... H04L 45/74 |

OTHER PUBLICATIONS

Vyenkatesh Deshpande "VXLAN Series—How VTEP Learns and Creates Forwarding Table—Part 5", dated May 24, 2013, 5 pages.

* cited by examiner

METHODS FOR IDENTIFYING A SOURCE LOCATION IN A SERVICE CHAINING TOPOLOGY

BENEFIT CLAIM

This application claims the benefit under 35 U.S.C. § 120 as a continuation-in-part of application Ser. No. 16/526,788, filed on Jul. 30, 2019, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

BACKGROUND

Software defined networking ("SDN") typically supports a variety of networking services, including network monitoring solutions, intrusion detection services ("IDS"), intrusion prevention services ("IPS"), and the like. The services may be provided by service virtual machines ("SVMs") implemented in computer hosts. The services may be inserted into a packet processing path and consumed by guest virtual machines ("GVMs") supported by the computer hosts. A GVM is a virtualized computing instance or a workload executed on a computer host. A virtualized computing instance may include an addressable data compute node or an isolated user space instance, often referred to as a name space container.

A packet originated by a GVM, also referred to as a source GVM, may be serviced by one or more SVMs. If several SVMs apply their services sequentially to the packet, then the sequentially operating SVMs are referred to as an SVM service chain.

Inserting services into a packet processing path usually requires implementing a computer-based-framework configured to support the servicing of the packet. This may include defining a service-path for the packet that originated at a source GVM and a chain of SVMs that need to apply their services the packet.

Since SVMs of a service chain could be instantiated on multiple hosts and the hosts supporting the SVMs may be different than a host on which a source GVM is instantiated, the SVMs need to learn a location of a source host that implements the source GVM in a network so that the serviced packet, if it is not dropped, can be returned by a last SVMs in the service chain back to the source host to allow the source host to forward to packet toward the packet's destination.

One way to learn the location of a host that implements the source GVM in the network is to generate periodic broadcasts, or the Reverse Address Resolution Protocol ("RARP") messages. However, this approach is often quite inefficient and bandwidth-demanding.

SUMMARY

In an embodiment, mechanisms for determining a location of a source host that hosts a source GVM in a service chaining topology are presented. A source GVM is a GVM that originated a packet that, in turn, was serviced by a chain of SVMs. The mechanisms may be used to determine the location of the source host that implements the source GVM when SVMs in the service chain determine that the packet is not to be dropped and that the packet needs to be returned to the host to allow the host to, for example, forward the packet toward the packet's destination.

Since a source GVM may be implemented on a computer host that is different from the host(s) on which the SVMs are implemented, to return a serviced packet to the host that implements the source GVM, a last SVM in the service chain needs to know the location of the source host that hosts the source GVM in a network. The mechanisms described herein allow the SVMs to determine such a location without generating and transmitting periodic broadcasts.

In this context, a location of a source host may include, for example, both a MAC address and an IP address of a virtual tunnel endpoint ("VTEP") to which the source GVM is connected in a virtual network. The MAC address and the IP address of the VTEP may be found in, for example, a "MAC addresses to VTEP MAC/IP addresses" binding that is usually created in advance, but that is typically not readily accessible to SVMs. For the brevity of the description, the binding is abbreviated herein to a "MAC to VTEP" binding. The approach described herein provides mechanisms for accessing the bindings to find the VTEP address of the VTEP to which the source GVM is connected.

In an embodiment, a service-plane overlay network for SVMs is provided by a specially reserved virtual switch and uses a service virtual network identifier ("SVNI"). All service-endpoints of the SVMs are terminated at the ports on that switch. The service-path traffic is isolated from the guest traffic because the service-path traffic uses the SVNI of the service-plane overlay network, while the guest traffic uses virtual network identifiers ("VNIs") of a virtual overlay network which is different from the service-plane overlay network. Because the service paths for different packets may vary, learning a "MAC to VTEP" binding for a source host needs to be performed dynamically for each packet.

In an embodiment, the mechanisms use a controller-based approach. In this approach, an SDN controller is modified and configured to receive, from computer hosts, "MAC to VTEP" bindings each time a virtual network interface card ("VNIC") of a GVM, or an SVM, is associated with a virtual overlay network. Upon receiving the bindings, the controller stores the bindings in data structures, such as tables. The tables may be organized per VNIs and SVNIs. Hence, when a host implementing a source GVM sends, for example, a "VNI1: MAC to VTEP1" binding, the SDN controller may receive and store the binding of the "MAC to VTEP1" in a table corresponding to the VNI1.

In the controller-based approach, the controller may provide the "MAC to VTEP" bindings to the hosts each time the controller receives a binding from a host, and the hosts themselves may handle the queries for locations of source hosts that implement the GVMs. For example, when a service plane implementation module that is executing on a host that supports a last SVM in a service chain sends a query for a VTEP address of a VTEP to which a source GVM is connected, the host may identify, in the query, a MAC address of the VTEP of the source host, use the MAC address as a search key to search all the tables that store the "MAC to VTEP" bindings for all VNIs and SVNIs, find a particular binding that includes the MAC address provided in the query, and provide either the particular binding, or the VTEP MAC/IP addresses extracted from the particular binding, to the host of the SVM.

Alternatively, the hosts may send the "MAC to VTEP" bindings directly to the hosts implementing the SVMs each time a binding is received, and the hosts may handle the queries for locations of source hosts that implement source GVMs without querying the controller. In this approach, an SDN controller does not automatically provide the bindings to the hosts each time a binding is received. Instead, the hosts implementing the SVMs receive and store all the bindings needed to resolve the queries for the VTEP information. For example, upon receiving a query from a service plane implementation module that is executing on a host that supports a last SVM in a service chain that serviced a packet, the host implementing the SVM uses a service plane MAC ("spmac") address, which corresponds to a MAC address of the source GVM, as a search key to search the "VM MAC to VTEP" bindings for all VNIs and SVNIs, finds a particular binding that includes the spmac, and provides the particular binding (or the VTEP address from the particular binding) to the host of the SVM so that the host can determine the VTEP location of the VTEP of the host to which the source GVM is connected.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
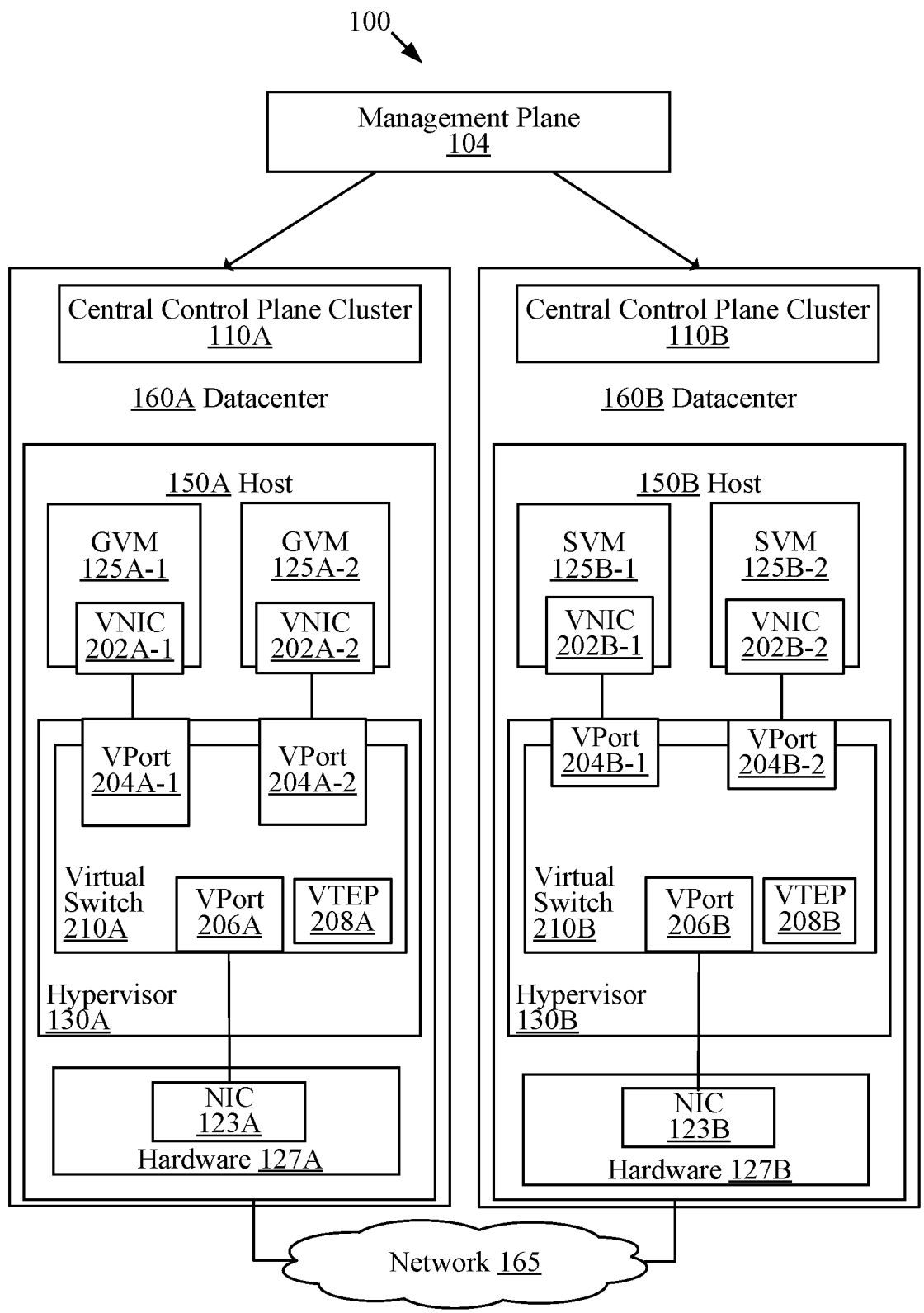
FIG. 1 is a block diagram depicting an example physical implementation view of an example logical network environment for realizing mechanisms for identifying a source location in a service chaining topology.

FIG. 1 is a block diagram depicting an example physical implementation view of an example logical network environment for realizing mechanisms for identifying a source location in a service chaining topology. The depicted example comprises a system 100 that includes a management plane ("MP") 104, a plurality of datacenters 160A-160B and a computer network 165.

MP 104 may include multiple computing devices that implement management plane functions. MP 104 may be responsible for receiving network configuration input through an application programming interface ("API"), a command-line interface, and/or a graphical user interface. The network configuration input may specify, for example, how multiple VMs executing on the hosts of datacenters 160A-160B may communicate with each other. The network configuration input may include, for example, MAC addresses and IP addresses of virtual networking elements implemented in datacenters 160A-160B.

In an embodiment, datacenter 160A/160B includes a central control plane ("CCP") cluster 110A/110B that manages datacenter 160A/160B, respectively. Each CCP cluster 110A/110B may include a plurality of control planes to provide redundancy, reliability, fault tolerance, and load balance. Datacenters 160A-160B may also include hosts 150A-150B. Although FIG. 1 shows that host 150A implements only GVMs and host 150B implements only SVMs and shows the two hosts in separate datacenters having separate control planes, in alternate embodiments, a particular host may have one or more SVMs and/or one or more GVMs. Several hosts may reside in the same datacenter or may be distributed across any number of datacenters. However, for performance-related reasons, it may be preferred to implement the SVMs on the same host or in the same datacenter as source GVMs.

CCP clusters 110A-110B may be responsible for exchanging runtime state information. Runtime state information typically refers to data that can be used to instruct data path processes (not shown) executing in hosts 150A-150B how to handle traffic encapsulation and forwarding. The runtime state information may include, for example, "MAC to VTEP" bindings and other data managed by, for example, a VTEP 208A and VTEP 208B. VTEP 208A may be configured to, for example, encapsulate packets originated by a VM instantiated on host 150A and route the encapsulated packet to VTEP 208B implemented on host 150B.

Hosts 150A-150B may be referred to as computing devices, host computers, host devices, physical servers, server systems, or physical machines. The hosts may include hardware components such as commodity hardware computing platforms including computing processors, memory units, physical network interface cards, and storage devices (not shown).

In an embodiment, hosts 150A-150B are physical computing devices that support the execution of one or more GVMs 125A-1, 125A-2, and one or more SVMs 125B-1, 125B-2, respectively. Hosts 150A-150B are configured with virtualization layers, referred to herein as hypervisors 130A-130B, respectively. Hypervisor 130A abstracts a processor, memory, storage, and networking resources of a corresponding hardware platform into multiple GVMs 125A-1, 125A-2. Hypervisor 130B abstracts a processor, memory, storage, and networking resources of a corresponding hardware platform into multiple SVMs 125B-1, 125B-2.

Architectures of hypervisors 130A-130B may vary. In some embodiments, hypervisor 130A/130B is installed as a bare-metal installation directly on the host 150A/150B and interposed between the physical hardware and the guest operating systems executing in GVMs 125A-1, 125A-2 and SVMs 125B-1, 125B-2. In other embodiments, hypervisor 130A/130B is implemented as an additional layer on the top of a conventional host operating system.

GVMs 125A-1, 125A-2 and SVMs 125B-1, 125B-2 are examples of virtualized computing instances or workloads. A virtualized computing instance may include an addressable data compute node or an isolated user space instance, often referred to as a name space container.

GVM 125A-1/125A-2 comprises a software-based VNIC 202A-1/202A-2, respectively, that may be configured by a local control plane (not shown) running on host machine 150A. VNICs 202A-1, 202A-2 provide network access for GVMs 125A-1, 125A-2, respectively. VNICs 202A-1 and 202A-2 are typically connected to corresponding virtual ports, such as ports 204A-1, 204A-2, respectively, of a virtual network switch 210A. Virtual switch 210A is a forwarding element implemented in software by hypervisor 130A.

SVM 125B-1/125B-2 comprises a software-based VNIC 202B-1/202B-2, respectively, that may be configured by a local control plane (not shown) running on host machine 150B. VNICs 202B-1, 202B-2 provide network access for SVMs 125B-1, 125B-2, respectively. VNICs 202B-1 and VNIC 202B-2 are typically connected to corresponding virtual ports, such as ports 204B-1 and 204B-2, respectively, of a virtual network switch 210B. Virtual switch 210B is a forwarding element implemented in software by hypervisor 130B.

Hardware 127A/127B of host 150A/150B, respectively, includes hardware components such as one or more processors (not shown), a system memory unit (not shown), a storage system (not shown), I/O devices, and a network interface ("NIC") 123A/123B, respectively. NIC 123A/123B enables host 150A/150B, respectively, to communicate with other devices via a communication medium, such as network 165. NIC 123A/123B may be used to transmit data from virtual port 206A/206B, respectively, to and from network 165.

2. Example Process for Servicing a Packet by Service Virtual Machines

Figure 2A:
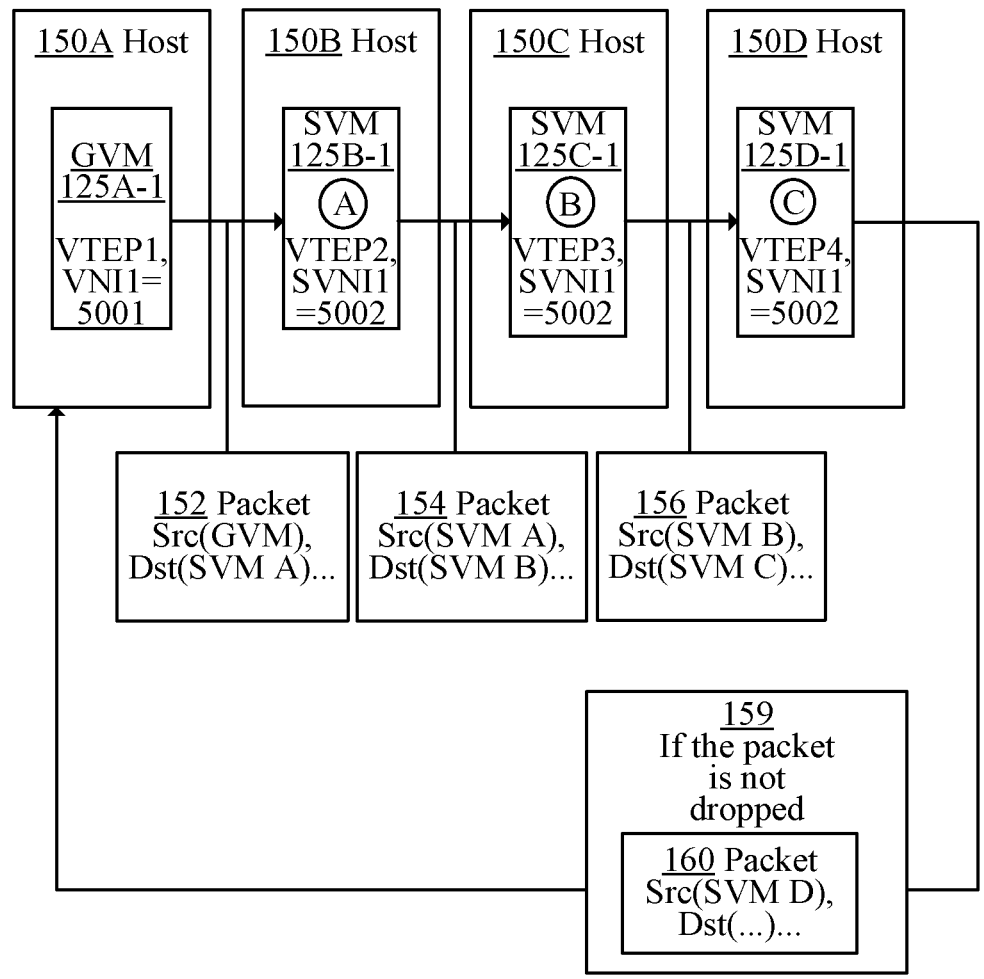
FIG. 2A is a block diagram depicting an example process for servicing a packet by service virtual machines.
Figure 2B:
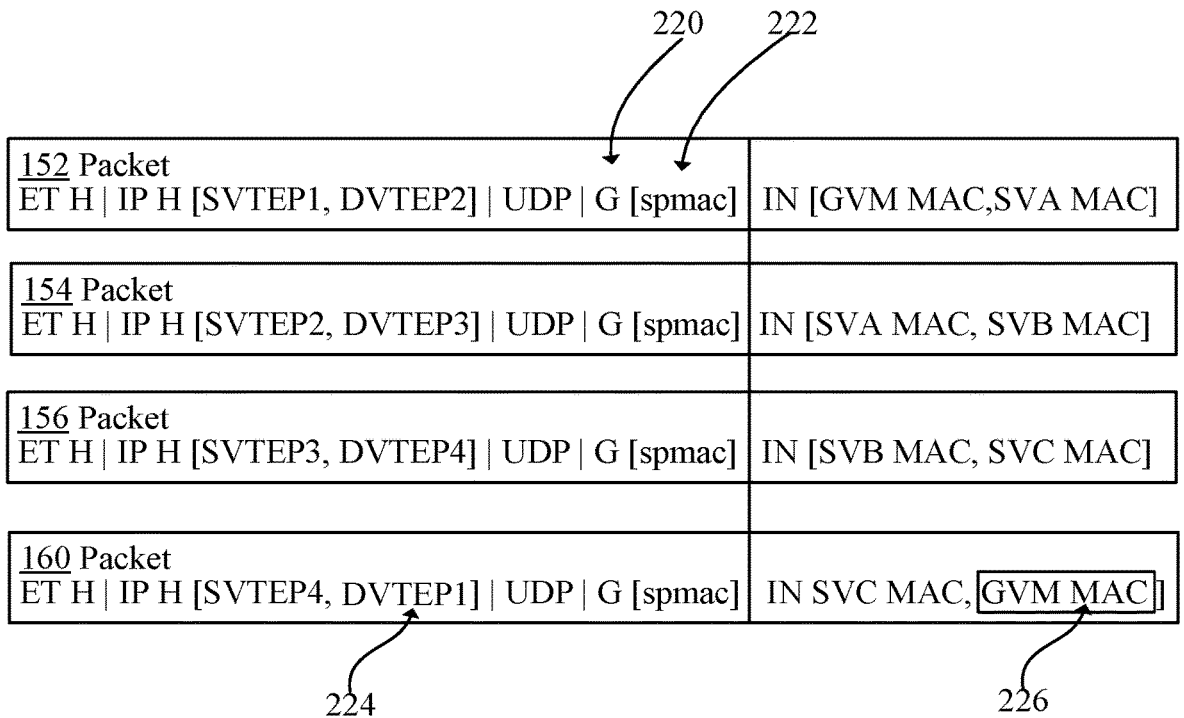
FIG. 2B is an example of a packet header of a packet serviced by service virtual machines.

FIG. 2A is a block diagram depicting an example process for servicing a packet by service virtual machines, while FIG. 2B is an example of a packet header of a packet serviced by service virtual machines. Suppose that GVM 125A-1 is a source GVM that originated a packet that needs to be serviced by one or more SVMs. The example shown in FIG. 2A depicts a service chain of three SVMs, including SVMs 125B-1 implemented on a host 150B, SVM 125C-1 implemented on a host 150C, and SVM 125D-1 implemented on a host 150D. SVM 125B-1 is referred to as "A," SVM 125C-1 is referred to as "B," and SVM 125D-1 is referred to as "C."

Suppose that: a binding generated for source GVM 125A-1 is "VNI1: GVM MAC to VTEP1," where VNI1 is 5001; a binding generated for SVM 125B-1 is "SVNI1: SVMA MAC to VTEP2," where SVNI1 is 5002; a binding generated for SVM 125C-1 is "SVNI1: SVMB MAC to VTEP3;" and a binding generated for SVM 125D-1 is "SVNI1: SVMC MAC to VTEP4."

Suppose that a packet that was originated by source GVM 125A-1 is to be serviced first by SVM 125B-1. To send the packet to SVM 125B-1 on a different host, the source host for GVM 125A-1 encapsulates the packet with a plurality of headers to form a packet 152. A source of packet 152 is GVM 125A-1, while a destination of packet 152 is SVM 125B-1.

An example of packet 152 is depicted in FIG. 2B, which is meant to illustrate only some of the headers of a typical packet, and in which the names of the headers are abbreviated. FIG. 2B shows that packet 152 comprises outer headers and inner headers (a payload is not shown). The outer headers comprise an Ethernet header, an IP header, a UDP header, a Geneve header 220, and other headers (not shown). The IP header stores, among other things, a source VTEP1 address ("SVTEP1") of the VTEP1 to which GVM 125A-1 is connected, and a destination VTEP2 address ("DVTEP2") of the VTEP2 of SVM 125B-1. Geneve header 220 may store, in its option field, a spmac 222, which is a MAC address of GVM 125A-1. The inner headers store, among other things, a GVM MAC address as a source MAC address, and an SVA MAC address of SVM 125B-1 as a destination MAC address. The remaining content of packet 152 is omitted as it is irrelevant to the approach disclosed herein.

Upon receiving packet 152, SVM 125B-1 services packet 152, and, if the packet is not dropped and the next SVM is on a different host, the host for SVM 125B-1 encapsulates a resulting packet with a plurality of headers to form a packet 154. A source of packet 154 is SVM 125B-1, while a destination of packet 154 is SVM 125C-1. However, if SVM "A" and SVM "B" are on the same host, then encapsulation is not needed; the host simply passes the packet to the next SVM. This is true each time a packet is passed between GVMs and/or SVMs.

An example of encapsulated packet 154 is depicted in FIG. 2B, which shows that packet 154 comprises outer headers and inner headers (a payload is not shown). The outer headers comprise an Ethernet header, an IP header, a UDP header, a Geneve header, and other headers (not shown). The IP header stores, among other things, a source VTEP2 address ("SVTEP2") of the VTEP2 of SVM 125B-1, and a destination VTEP3 address ("DVTEP3") of the VTEP3 of SVM 125C-1. The Geneve header may store, in its own option field, the spmac which is the MAC address of source GVM 125A-1. The inner headers store, among other things, an SVA MAC address of SVM 125B-1 as a source MAC address, and an SVB MAC address of SVM 125C-1 as a destination MAC address. The remaining content of packet 154 is omitted as it is irrelevant to the approach disclosed herein.

Upon receiving packet 154, SVM 125C-1 services packet 154, and, if the packet is not dropped and the next SVM is on a different host, then the host for SVM 125C-1 encapsulates a resulting packet with a plurality of headers to form a packet 156. A source of packet 156 is SVM 125C-1, while a destination of packet 156 is SVM 125D-1.

An example of packet 156 is depicted in FIG. 2B, which shows that packet 156 comprises outer headers and inner headers (a payload is not shown). The outer headers comprise an Ethernet header, an IP header, a UDP header, a Geneve header, and other headers (not shown). The IP header stores, among other things, a source VTEP3 address ("SVTEP3") of the VTEP3 of SVM 125C-1, and a destination VTEP4 address ("DVTEP4") of the VTEP4 of SVM 125D-1. The Geneve header may store, in its option field, the spmac which is the MAC address of GVM 125A-1. The inner headers store, among other things, an SVB MAC address of SVM 125C-1 as a source MAC address, and an SVC MAC address of SVM 125D-1 as a destination MAC address. The remaining content of packet 156 is omitted as it is irrelevant to the approach disclosed herein.

Upon receiving packet 156, SVM 125D-1 services packet 156, and, if the packet is not dropped (as shown in an element "159") and GVM 125A-1 is on a different host than the host that implements SVM 125D-1, the host for SVM 125D-1 tries to encapsulate a resulting packet with headers to form a packet 160. A source of packet 160 is known; it is SVM 125D-1. However, a VTEP destination of packet 160 is not readily known to the host of SVM 125D-1 because the VTEP information of the VTEP1 to which GVM 125A-1 is connected is not readily available to the host of SVM 125D-1. The host for SVM 125D-1 may, however, obtain that information using the process described later in FIG. 3.

An example of packet 160 is depicted in FIG. 2B, which shows that packet 160 comprises outer headers and inner headers (a payload is not shown). The inner headers store, among other things, an SVC MAC address of SVM 125D-1 as a source MAC address, and an GVM MAC address 226

(which is known) of GVM 125A-1 as a destination MAC address. The outer headers comprise an Ethernet header, an IP header, a UDP header, a Geneve header, and other headers (not shown). The Geneve header may store, in its option field, the spmac which is the MAC address of GVM 125A-1. The IP header stores, among other things, a source VTEP4 address ("SVTEP4") of the VTEP4 of the host that implements SVM 125D-1. However, a destination DVTEP1 224 of the VTEP1 of the host that implements GVM 125A-1 is unknown to the host of SVM 125D-1. The host of SVM 125B-1 can determine DVTEP1 224 using, for example, the approach described later in FIG. 3.

Figure 3:
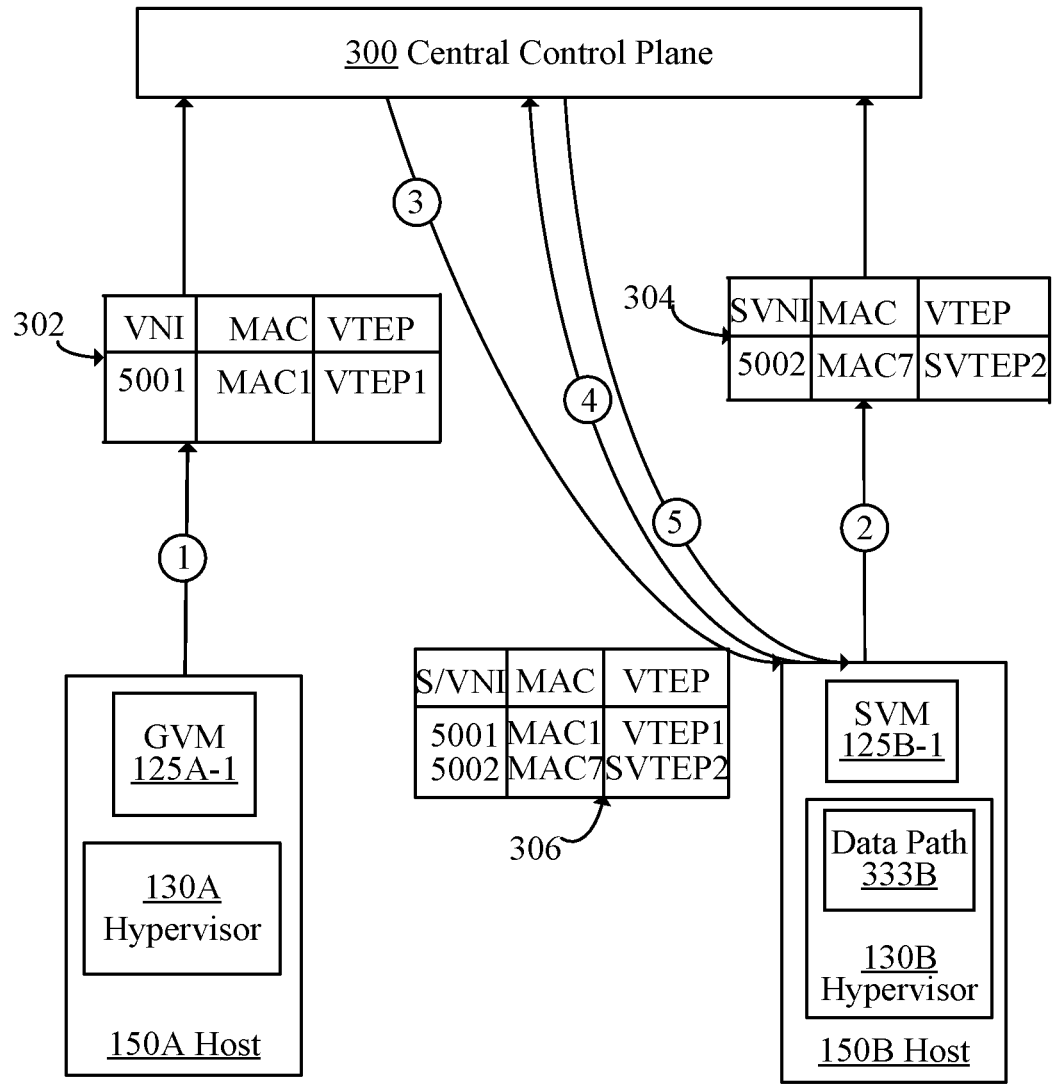
FIG. 3 is a block diagram depicting example mechanisms for identifying a source location in a service chaining topology.
Figure 4A:
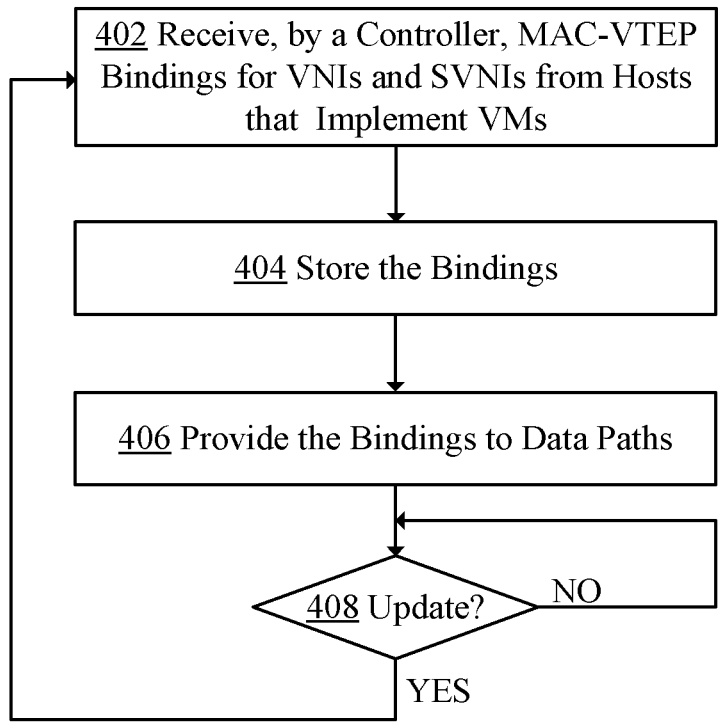
FIG. 4A is an example flow chart for a controller-based approach for providing bindings to a controller.
Figure 4B:
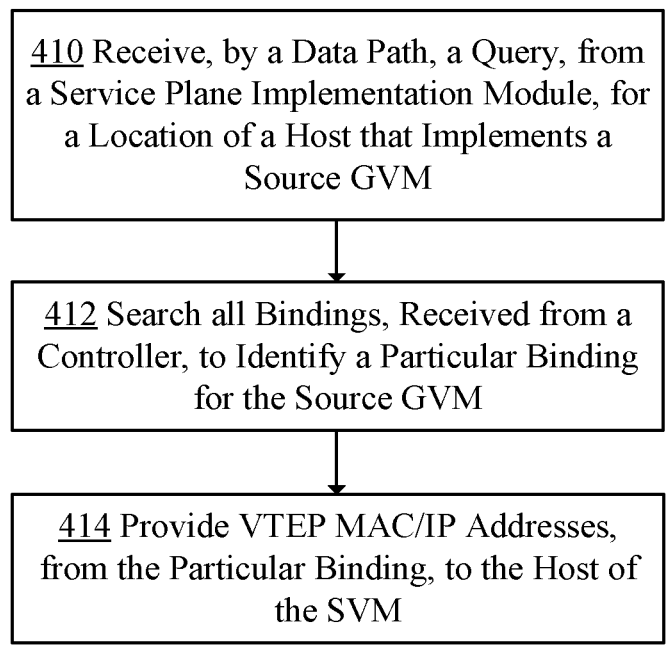
FIG. 4B is an example flow chart for a controller-based approach.

3. Approaches for Identifying a Location of a Source Host That Hosts a Guest Virtual Machine FIG. 3 is a block diagram depicting example mechanisms for identifying a source location in a service chaining topology. More specifically, FIG. 3 depicts the mechanisms for determining both a VTEP MAC address and a VTEP IP address of a VTEP to which a source GVM, which originated a packet, is connected. Furthermore, FIG. 4A is an example flow chart for a controller-based approach for providing bindings to a controller, while FIG. 4B is an example flow chart for a controller-based approach. It is assumed in this section that a last SVM in a service chain is implemented in a host that is different than a host on which a source GVM is implemented.

FIG. 3 depicts that CCP 300 receives (an element "1" and an element "2") "MAC to VTEP" bindings for VNIs and SVNIs from hosts 150A and 150B that implement GVMs (such as GVM 125A-1), and SVMs (such as SVM 125B-1). For example, CCP 300 may receive ("1") a binding 302 "5001: MAC1 to VTEP1," where 5001 is a VNI. Furthermore, CCP 300 may receive ("2") a binding 304 "5002: MAC7 to SVTEP2," where 5002 is an SVNI.

The receiving step corresponds to step 402 in FIG. 4A, in which the controller receives MAC to VTEPs bindings for VNIs and SVNIs from the hosts that implement the GVMs and SVMs, respectively.

Upon receiving the MAC to VTEP bindings for the VNIs and SVNIs, CCP 300 stores the bindings in data structures. Examples of the data structures include tables that are organized by the VNIs and SVNIs and that may be similar to a data structure 306 shown in FIG. 3. The storing step corresponds to step 404 in FIG. 4A, in which the controller stores the bindings in the data structures.

CCP 300 may automatically provide (an element "3") the bindings to hosts 150A-150B that support virtual machines each time CCP 300 receives a binding from any of hosts 150A-150B. For example, CCP 300 may automatically provide ("3") information about the "5001: MAC1 to VTEP1" binding and information about the "5002: MAC7 to SVTEP2" binding to a data path process 333B implemented in host 150A.

The providing step is also depicted in FIG. 4A, which shows that, in step 406, the controller provides the MAC to VTEP bindings to the data path processes.

Periodically, the controller may check, in step 408 depicted in FIG. 4A, whether new or updated binding information has been provided to the controller by the hosts. If the new or updated information about the bindings is provided, then the controller proceeds to performing step 402. Otherwise, the controller awaits the information about the new bindings or the updated bindings in step 408.

In step 410 of FIG. 4B, a host, or a data path process executing on the host that implements a last SVM in a service chain, receives a query requesting a location of a source host that implements a source GVM. The query may be generated by, for example, a service plane implementation module that is executing on the host that implements the SVM. The query may include a MAC address of the source GVM. That MAC address is known to the host that implements the SVM.

Referring to FIG. 3, data path process 333B executing in hypervisor 130B of host 150B may receive a query for a the VTEP MAC/IP addresses of the VTEP to which GVM 125A-1 is connected. The query may include a MAC1 address of GVM 125A-1.

In response to receiving the query, the host or the data path process searches, in step 412 of FIG. 4B, all bindings for all VNIs and SVNIs to identify a particular binding that includes the MAC address of the VTEP to which the source GVM is connected.

Referring to FIG. 3, data path process 333B executing in hypervisor 130B may search all the bindings, like the bindings shown in table 306, for all VNIs and SVNIs to identify a "5001: MAC1 to VTEP1" binding because that binding includes the MAC1 address.

In step 414 of FIG. 4B, the host or the data path process provides either the entire particular binding, or both a VTEP MAC address and a VTEP IP address extracted from the particular binding to the host that implements the SVM.

Referring to FIG. 3, data path process 333B may, for example, provide, to the host of SVM 125B-1, the "5001: MAC1 to VTEP1" binding, or the VTEP1 MAC/IP addresses extracted from the "5001: MAC1 to VTEP1" binding.

Alternatively, controller 300, shown in FIG. 3, may receive (an element "4") a query, from the service plane implementation module that is executing on the host of SVM 125B-1, for the VTEP MAC/IP addresses of the VTEP to which GVM 125A-1 is connected. In response to receiving the query, controller 300 may search all bindings for all VNIs and SVNIs to identify a particular binding that includes a spmac. Then, controller 300 may provide (an element "5"), to the host of SVM 125B-1, both the VTEP1 MAC address and the VTEP1 IP address extracted from the particular binding "5001: MAC1 to VTEP1."

Figure 5A:
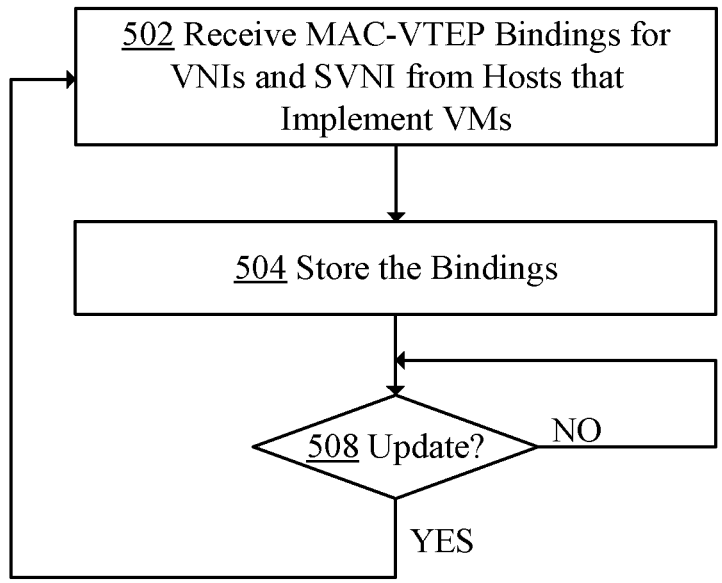
FIG. 5A is an example flow chart for providing bindings to hosts.
Figure 5B:
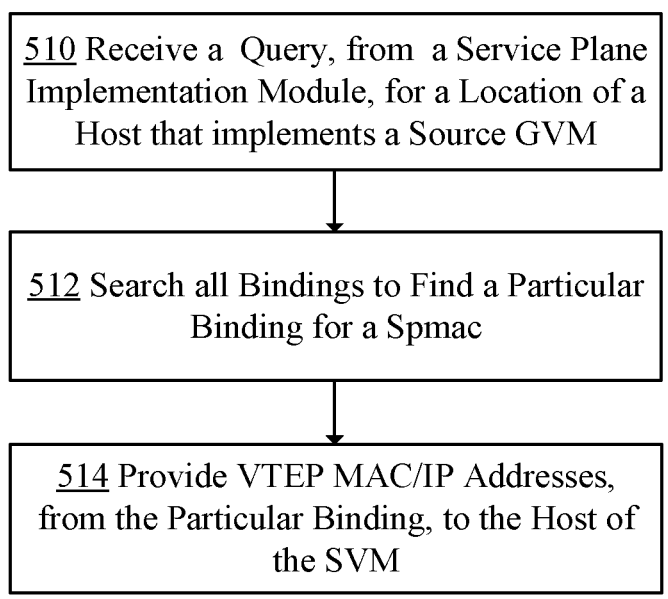
FIG. 5B is an example flow chart using bindings provided to hosts.

An alternative approach is shown in FIG. 5A-5B. FIG. 5A is an example flow chart for providing bindings to hosts, while FIG. 5B is an example flow chart using bindings provided to hosts. In step 502 of FIG. 5A, a host implementing a last SVM in a service chain receives "MAC to VTEP" bindings from the hosts implementing the VMs each time a binding is created. In step 504, the host stores the bindings. The bindings will include the bindings for VNIs and SVNIs. In step 508, the host awaits information about new bindings and/or information about updated bindings. If that information is received, then the host proceeds to step 502; otherwise, the host awaits the information in step 508.

In step 510 of FIG. 5B, the host receives, from a service plane implementation module that is executed on the host, a query requesting a location of a source GVM. For example, referring to FIG. 3, host 150B may receive a query for the VTEP MAC/IP addresses of the VTEP to which GVM 125A-1 is connected.

In response to receiving the query, the host searches, in step 512, all received bindings for all VNIs and SVNIs to identify a particular binding that includes a spmac, which corresponds to a MAC address of the source GVM. Referring to FIG. 3, suppose that the spmac is a MAC1 address of GVM 125A-1. Hence, host 150B may search the bindings to identify a particular binding "5001: MAC1 to VTEP1" that includes the spmac, i.e., the MAC1 address of GVM 125A-1.

In step 514, the host uses both a VTEP MAC address and a VTEP IP address extracted from the particular binding to encapsulate the serviced packet. For example, referring to FIG. 3, host 150B may use both the VTEP1 MAC address and the VTEP1 IP address, extracted from the particular binding "5001: MAC1 to VTEP1," to encapsulate the extracted packet.

The presented approaches may be optimized to support datacenters that host thousands of VMs to efficiently manage the storage space and time latency in the datacenters as the datacenters execute the presented mechanisms for identifying a source location in a service chaining topology.

4. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

5. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A computer-implemented method for identifying a source location of a packet-originating guest virtual machine in a service chaining topology, the method comprising:

receiving a query, from a service plane implementation module executing on a host of a service virtual machine ("SVM"), for a location of a source host implementing a guest virtual machine ("source GVM") that originated a packet in a computer network and that serviced the packet;

in response to receiving the query, performing a search of one or more bindings associated with one or more virtual network identifiers ("VNIs") or service virtual network identifiers ("SVNIs") to identify a particular binding that includes a MAC address of the host implementing the source GVM;

identifying, in the particular binding, the location of the source host; and providing the location of the source host to the host of the SVM to facilitate forwarding of the packet from the SVM to the source GVM, wherein the SVM is a last SVM in a service chain defined for servicing the packet originated at the source GVM.

2. The computer-implemented method of claim 1, wherein the one or more bindings associated with the one or more VNIs or SVNIs are received by a controller, configured to control one or more computer hosts that implement the SVM and the source GVM, from the one or more computer hosts that implement the SVM and the source GVM; and wherein a binding, of the one or more bindings, comprises an association between a virtual machine MAC address and a virtual tunnel endpoint ("VTEP") MAC address and a VTEP Internet Protocol ("IP") address.

3. The computer-implemented method of claim 2, wherein the query is received and processed by the controller configured to control the one or more computer hosts that implement the SVM and the source GVM.

4. The computer-implemented method of claim 2, wherein the one or more bindings associated with the one or more VNIs or SVNIs are received by a data path process executing in a hypervisor implemented in a host that supports the SVM; and wherein the query is received and processed by the data path processes executing in the hypervisor implemented in the host that supports the SVM.

5. The computer-implemented method of claim 1, wherein the location of the source host that implements the source GVM includes both a MAC address and an IP address of a VTEP to which the source GVM is connected.

6. The computer-implemented method of claim 1, wherein the host of the SVM uses information about the location of the source host to encapsulate a serviced packet and provide the encapsulated packet to the source GVM.

7. One or more non-transitory computer-readable storage media storing one or more computer instructions which, when executed by one or more processors, cause the one or more processors to perform:

receiving a query, from a service plane implementation module executing on a host of a service virtual machine ("SVM"), for a location of a source host implementing a guest virtual machine ("source GVM") that originated a packet in a computer network and that serviced the packet;

in response to receiving the query, performing a search of one or more bindings associated with one or more virtual network identifiers ("VNIs") or service virtual network identifiers ("SVNIs") to identify a particular binding that includes a MAC address of the host implementing the source GVM;

identifying, in the particular binding, the location of the source host; and providing the location of the source host to the host of the SVM to facilitate forwarding of the packet from the SVM to the source GVM, wherein the SVM is a last SVM in a service chain defined for servicing the packet originated at the source GVM.

8. The one or more non-transitory computer-readable storage media of claim 7, wherein the one or more bindings associated with the one or more VNIs or SVNIs are received by a controller, configured to control one or more computer hosts that implement the SVM and the source GVM, from the one or more computer hosts that implement the SVM and the source GVM; and wherein a binding, of the one or more bindings, comprises an association between a virtual machine MAC address and a virtual tunnel endpoint ("VTEP") MAC address and a VTEP Internet Protocol ("IP") address.

9. The one or more non-transitory computer-readable storage media of claim 8, wherein the query is received and processed by the controller configured to control the one or more computer hosts that implement the SVM and the source GVM.

10. The one or more non-transitory computer-readable storage media of claim 8, wherein the one or more bindings associated with the one or more VNIs or SVNIs are received by a data path process executing in a hypervisor implemented in a host that supports the SVM; and
wherein the query is received and processed by the data path processes executing in the hypervisor implemented in the host that supports the SVM.

11. The one or more non-transitory computer-readable storage media of claim 7, wherein the location of the source host that implements the source GVM includes both a MAC address and an IP address of a VTEP to which the source GVM is connected.

12. The one or more non-transitory computer-readable storage media of claim 7, wherein the host of the SVM uses information about the location of the source GVM to encapsulate a serviced packet and provide the encapsulated packet to the source GVM.

13. A hypervisor implemented in a computer network and configured to implement mechanisms for identifying a source location of a packet-originating guest virtual machine in a service chaining topology, the hypervisor comprising:
one or more processors;
one or more memory units; and
one or more non-transitory computer-readable storage media storing one or more computer instructions which, when executed by the one or more processors, cause the one or more processors to perform:
receiving a query, from a service plane implementation module executing on a host of a service virtual machine ("SVM"), for a location of a source host implementing a guest virtual machine ("source GVM") that originated a packet in a computer network and that serviced the packet; in response to receiving the query, performing a search of one or more bindings associated with one or more virtual network identifiers ("VNIs") or service virtual network identifiers ("SVNIs") to identify a particular binding that includes a MAC address of the host implementing the source GVM;
identifying, in the particular binding, the location of the source host; and
providing the location of the source host to the host of the SVM to facilitate forwarding of the packet from the SVM to the source GVM, wherein the location of the source host that implements the source GVM includes both a MAC address and an IP address of a VTEP to which the source GVM is connected.

14. The hypervisor of claim 13, wherein the one or more bindings associated with the one or more VNIs or SVNIs are received by a controller, configured to control one or more computer hosts that implement the SVM and the source GVM, from the one or more computer hosts that implement the SVM and the source GVM; and wherein a binding, of the one or more bindings, comprises an association between a virtual machine MAC address and a virtual tunnel endpoint ("VTEP") MAC address and a VTEP Internet Protocol ("IP") address.

15. The hypervisor of claim 14, wherein the one or more bindings associated with the one or more VNIs or SVNIs are received by a data path process executing in the hypervisor implemented in a host that supports the SVM; and wherein the query is received and processed by the data path processes executing in the hypervisor implemented in the host that supports the SVM.

16. The hypervisor of claim 13, wherein the SVM is a last SVM in a service chain defined for servicing the packet originated at the source GVM.

17. The hypervisor of claim 13, wherein the host of the SVM uses information about the location of the source GVM to encapsulate a serviced packet and provide the encapsulated packet to the source GVM.

18. One or more non-transitory computer-readable storage media storing one or more computer instructions which, when executed by one or more processors, cause the one or more processors to perform:
receiving a query, from a service plane implementation module executing on a host of a service virtual machine ("SVM"), for a location of a source host implementing a guest virtual machine ("source GVM") that originated a packet in a computer network and that serviced the packet;
in response to receiving the query, performing a search of one or more bindings associated with one or more virtual network identifiers ("VNIs") or service virtual network identifiers ("SVNIs") to identify a particular binding that includes a MAC address of the host implementing the source GVM;
identifying, in the particular binding, the location of the source host; and
providing the location of the source host to the host of the SVM to facilitate forwarding of the packet from the SVM to the source GVM, wherein the location of the source host that implements the source GVM includes both a MAC address and an IP address of a VTEP to which the source GVM is connected.

19. The one or more non-transitory computer-readable storage media of claim 18, wherein the one or more bindings associated with the one or more VNIs or SVNIs are received by a controller, configured to control one or more computer hosts that implement the SVM and the source GVM, from the one or more computer hosts that implement the SVM and the source GVM;
and wherein a binding, of the one or more bindings, comprises an association between a virtual machine MAC address and a virtual tunnel endpoint ("VTEP") MAC address and a VTEP Internet Protocol ("IP") address.

20. The one or more non-transitory computer-readable storage media of claim 19, wherein the query is received and processed by the controller configured to control the one or more computer hosts that implement the SVM and the source GVM.

* * * * *